United States Patent [19]

Ehlers et al.

[11] Patent Number: 4,827,353
[45] Date of Patent: May 2, 1989

[54] METHOD OF AND CIRCUIT ARRANGEMENT FOR CHANGING THE RESOLUTION OF BINARY PSEUDO-HALFTONE PICTURES

[75] Inventors: Bernd Ehlers, Elmshorn; Gerhard Renelt, Hamburg, both of Fed. Rep. of Germany

[73] Assignee: U.S. Philips Corporation, New York, N.Y.

[21] Appl. No.: 945,109

[22] Filed: Dec. 19, 1986

[30] Foreign Application Priority Data

Dec. 20, 1985 [DE] Fed. Rep. of Germany ....... 3545157

[51] Int. Cl.[4] .................... H04N 1/40; H04N 1/393
[52] U.S. Cl. .................... 358/283; 358/287; 358/298
[58] Field of Search .................. 358/298, 283, 287

[56] References Cited

U.S. PATENT DOCUMENTS

| | | | |
|---|---|---|---|
| 4,698,778 | 10/1987 | Ito et al. | 358/287 |
| 4,701,808 | 10/1987 | Nagashima | 358/283 |
| 4,740,844 | 4/1988 | Yoshimura | 358/298 |

FOREIGN PATENT DOCUMENTS

| | | | |
|---|---|---|---|
| 58-161588 | 9/1983 | Japan | 358/283 |
| 60-142669 | 7/1985 | Japan | 358/283 |
| 60-142670 | 7/1985 | Japan | 358/283 |
| 60-223377 | 11/1985 | Japan | 358/283 |

OTHER PUBLICATIONS

Tuhro, Richard H., "Image Scaling Using Bit Throw-Away Memory", *Xerox Disclosure Journal*, vol. 5, No. 6, Nov./Dec. 1980, p. 639.

*Primary Examiner*—James J. Groody
*Assistant Examiner*—Randall S. Svihla
*Attorney, Agent, or Firm*—Jack E. Haken; F. Brice Faller

[57] ABSTRACT

A first pseudo-halftone picture is converted to a second pseudo-halftone picture of reduced resolution in the ration m:n by dividing the first picture into contiguous picture fields each having i·n lines and j·n columns of picture elements in contiguous square subfields each having $n^2$ picture elements. $m^2$ elements are selected from each subfield in accordance with a selection sequence which depends on the position of the subfield in the picture field, the elements being selected from all i·n lines and all j·n columns of each picture field, the selection sequence being the same for each picture field.

2 Claims, 2 Drawing Sheets

PRIOR ART

METHOD OF AND CIRCUIT ARRANGEMENT FOR CHANGING THE RESOLUTION OF BINARY PSEUDO-HALFTONE PICTURES

BACKGROUND OF THE INVENTION

The invention relates to a method of converting a first pseudo-halftone picture into a second pseudo-halftone picture such that $n^2$ picture elements of the first picture correspond to $m^2$ elements of the second picture, where $m \neq n$ and preferably $m < n$. The first pseudo-halftone picture is formed by a matrix of binary picture elements whose values are obtained in an ordered dither way from the scanning of an original document and comparing the picture elements arranged in a matrix of i lines and j columns to a set of different threshold values which are also arranged in a matrix having also i lines and j columns. The invention also relates to a circuit arrangement for performing the method.

The ordered dither method is, for example, described in Bell System Techn. Journal 48, 1969, pages 2555-2582 and is used to display, with the aid of matrix printers or screen display devices which can only display picture elements of equal sizes and intensity, pseudo-halftone pictures with good quality. For completeness, this known method will now be described in greater detail with reference to FIG. 1. Therein the subpicture 20 illustrates a portion of a scanned halftone picture having a size of four x four picture elements, the numbers incorporated in these picture elements indicating the brightness value or grey value of the relevant picture element. The higher a value the darker the picture element, so that it will be clear that in this subpicture 20 the picture elements taken on a diagonal from bottom left to top right become darker. In order to produce a binary pseudo-halftone picture therefrom, the subpicture 20 is compared with a matrix 21 of threshold values. When the brightness value or grey tone of a picture element exceeds the threshold value indicated in the corresponding picture element position of the matrix 21, a dot is recorded. The binary picture elements thus obtained are shown in the subpicture 22. Actually, the subpicture 20 or 22 are so small that in the pseudo-halftone picture the individual picture elements merge when they are observed at a normal viewing distance and a grey tone impression is obtained, which depends on the number of black picture elements in each subpicture 22.

The binary pseudo-halftone pictures obtained with the aid of the ordered dither method described in the foregoing can now be transmitted or stored. The reproduction is effected with devices which have the same resolution, that is to say the same number of elements per mm, when it is a requirement for the picture size to be maintained.

If one wants to reproduce such a transmitted or stored picture using a device having a different resolution, that is to say a different number of elements per mm, the picture size remaining the same, the number of picture elements must be increased when a higher resolution is required or decreased when a lower resolution is required. When this is effected such that uniformly spaced-apart picture lines and picture columns are suppressed or doubled, depending on whether an increase or a decrease of the resolution is required, the optical impression is degraded, at least at given ratios between the change in the resolution and predetermined values or configuration of the threshold values in the matrix 21, as, more specifically when picture lines and columns are omitted, when always those lines and columns are omitted which belong to the same lines and columns of the matrix 21, the corresponding halftones are lost. In addition, the change in resolution by the superpositioning of several frames may result in coarse structures.

SUMMARY OF THE INVENTION

The invention has for its object to provide a method of the type defined in the opening paragraph in which in the second pseudo-halftone picture the average distribution of the halftones remains basically unchanged and the first pseudo-halftone picture is as similar as possible to the second pseudo-halftone picture.

According to the invention, the first picture is divided into contiguous picture fields each having i.n x j.n picture elements with contiguous square sub-fields, each having n x n picture elements. From each sub-field $m^2$ picture elements are selected for the second picture in accordance with a selection sequence which is the same for each picture field and only depends on the position of the sub-field in the picture field. Picture elements from all the positions of the matrix are basically all considered equally often.

The second pseudo-halftone picture thus obtained comprises all the picture elements of the first pseudo-halftone picture obtained with all the different threshold values, to that its optical impression is basically maintained, apart from a loss of information which is inherently unavoidable when the resolution is reduced. Because of the always fixed selection sequence for all the picture fields a simple technical implementation of the method according to the invention is obtained.

There are several options for the special implementation of the selection sequence. For a change in resolution with the lowest possible degree of degradation it is efficient for the picture elements for the second picture to be selected from all the lines and all the columns of the picture fields of the first picture. This results in a very uniform distribution of the considered picture elements, already in relatively small picture areas.

For a particularly low cost and design effort in the technical realisation, it may however be appropriate to select the picture elements for the second picture from only a few lines and/or a few columns of the picture field of the first picture. This implies that individual lines and/or columns are completely omitted, these lines and/or columns however not forming a fully periodical structure within each picture field. A particularly simple possibility for the technical realisation is obtained when in accordance with a further practical example of the method according to the invention only the picture element, located at the crossing of a portion of the lines and columns, of the picture field of the first picture are selected for the second picture.

The distribution of the threshold values in the matrix 21 in FIG. 1 determines to a certain extent the optical impression of the first pseudo-halftone pictures or the similarity between this picture and its original. Consequently, it is appropriate that, in accordance with a further practical example of the method according to the invention, the selection of the picture elements for the second picture and arranging the picture elements selected from a picture field such as to form an output matrix is effected such that basically it corresponds to the matrix of the picture elements of the first picture.

Thus the threshold values of the matrix 21 in FIG. 1 are basically active in the second pseudo-halftone picture in a similar configuration.

BRIEF DESCRIPTION OF THE DRAWING

FIG. 1 shows a picture section, threshold matrix, and binary coded picture section of the ordered Dither method;

FIG. 2 and FIG. 3 show different selection sequences for a linear reduction in the resolution in a ratio 2:1.

DETAILED DESCRIPTION OF THE PREFERRED EMBODIMENT

Figures 1, 2, 3:
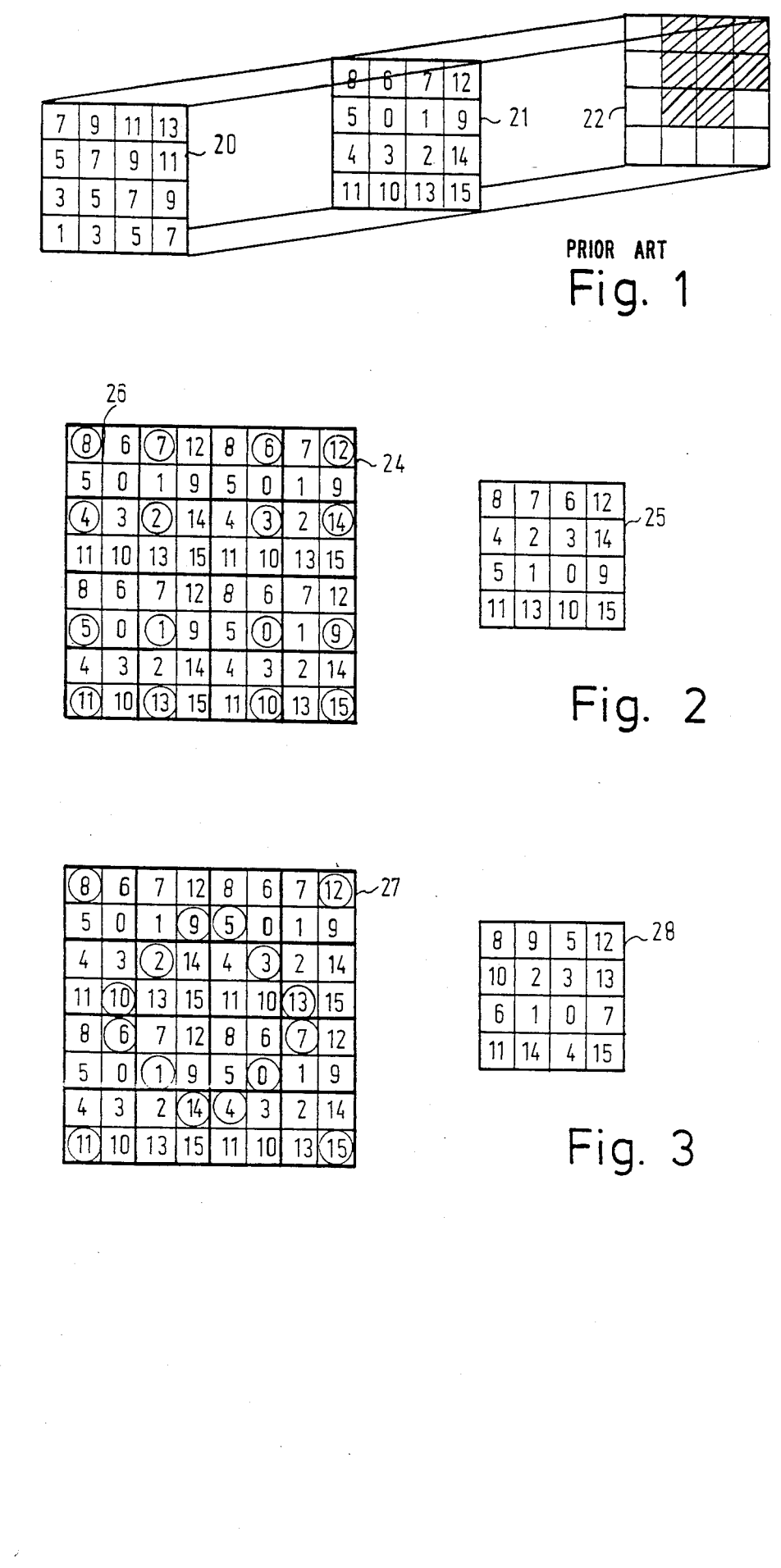
Figure 4:
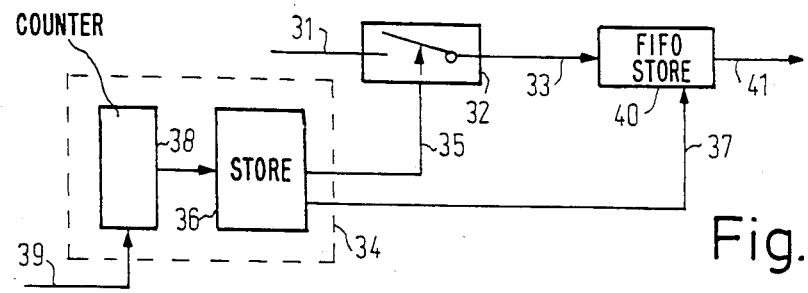
FIG. 4 is a block circuit diagram of an arrangement for producing halftone picture with a reduced resolution for a purely serial processing of the picture element signals.

With reference to FIG. 2, the selection sequence for reducing the resolution in a 2:1 ratio will now be described in detail, that is to say from a first pseudo-halftone picture a second pseudo-halftone picture is produced having half the number of picture elements in the line and column directions. This is based on a threshold values matrix, denoted by reference numeral 21 in FIG. 1, that is to say having the size and threshold value distribution as shown there. This matrix is here a square matrix with four lines and four columns. This matrix size and the ratio of the change in resolution results in the field 24 in FIG. 2 also being a square matrix with a size of 8×8 picture elements. Instead of the values of the binary picture element signals this field 24 shows the threshold values in the form of decimal numbers, which are used in the generation of the relevant picture element. Consequently, the picture field 24 comprises four picture element matrices which are each obtained from the matrix of threshold values, and for the selection sequence the picture field 24 is divided into a 4×4 array of sub-fields each having a 2×2 array of picture elements (as, for example, sub-field 26), in accordance with the desired resolution change ratio. Consequently, the first pseudo-halftone picture consists of a plurality of contiguous picture fields arranged in a similar way.

For producing the picture elements of the second pseudo-halftone picture with a reduced resolution, the picture elements within the circles in FIG. 2 are selected. They are therefore, the first, third, sixth and eighth picture elements in the first and third and also the sixth and eighth picture lines. When the threshold values associated with the selected picture elements, are included in a matrix, as in the matrix 25 in FIG. 2, it will be clear that basically the same structure of the matrix 21 of the threshold value in FIG. 1 is obtained. The four central elements are always exchanged diagonally and the central elements near the edges are interchanged. The use of this threshold value matrix 25 with the shown distribution over the scanned picture to produce a first pseudo-halftone picture with a higher resolution produces substantially exactly the same optical impression as the use of the threshold value matrix 21 in FIG. 1. In practical tests, the described selection of the picture elements for producing a second pseudo-halftone picture with a reduced resolution did not result in an essential change in the optical overall impression, apart from certain very fine losses in detail, which are fundamentally unavoidable. When the same selection method is used once again for such a pseudo-halftone picture with a reduced resolution to obtain a pseudo-halftone picture with a linearly fourfold reduced resolution compared to the original pseudo-halftone picture, the threshold values associated with the selected picture elements form a matrix which in every respect corresponds to the matrix 21 of FIG. 1.

FIG. 3 shows a different selection sequence which is based on the same conditions, that is to say a resolution which is reduced in a ratio 1:2 and the threshold value matrix 21 in FIG. 1. Hence, the picture field 27 in FIG. 3 has the same dimensions as the picture field 24 in FIG. 2 and also the same size and number of sub-fields. Also in this case only one picture element is selected from each sub-field in accordance with the reduction in a ratio 1:2 in the resolution but these picture elements are always located in different positions in adjacent sub-fields. In contrast to the selection sequence of FIG. 2, all the lines and columns of the picture fields 27 are taken into consideration in FIG. 3 and more specifically in a uniform manner, that is to say two picture elements are selected from each line or each column, respectively. The threshold values associated with the selected picture elements are shown in FIG. 3 as a matrix 28, and moreover the central elements are diagonally exchanged compared with the original matrix, whereas the central extreme elements are cyclically exchanged. In contrast thereto, the corners of the matrix are unchanged, as is also the case in the selection sequence shown in FIG. 2.

FIG. 4 shows the block circuit diagram of a general circuit arrangement by means of which the selection of the picture elements can be effected. Let it be assumed that the picture element signals of the picture lines of the first pseudo-halftone picture are serially applied to the input 31. This input 31 is connected to a data switch 32 which is controlled by a control arrangement 34 via the line 35 and closes the data switch 32 in accordance with the desired selection sequence, so that the picture element signals applied to the input 31 are conveyed through the line 33, except when the data switch 32 opens.

The control signals conveyed through the line 35 for actuating the data switch 32 are supplied in the control arrangement 34 by a store 36, which is addressed from the outputs of a counter 38. Via the input 39 this counter 38 receives a counting clock signal which is in synchronism with the picture element signals applied to the input 31. Consequently, the content of the store 36 corresponds directly to the selection sequence, for example as shown in FIG. 2 in the picture field 24 or in FIG. 3 in the picture field 27. As the selection sequences of the picture element in adjacent picture fields is the same, the store 36 must only receive the selection sequence of each line of the picture field only once, which is always repeated during one line of the total overall first pseudo-halftone picture. Relative to the examples shown in FIGS. 2 and 3, this can be effected in the most simple manner by using only the three bits of the lowest significance at the output of the counter 38 for addressing the store 36. While the counter 38 is counting the picture elements of a complete picture line, its output addresses the store 36 and selects a different area with a correspondingly different sequence of control signals, which are then again cyclically repeated for adjacent picture fields. Acting thus, the store 36 in the control arrangement 34 must only have as many storage locations as there are picture elements in the picture field.

As can be seen more specifically for the selection sequence in FIG. 3, the selected picture element signals on the line 33 do not occur uniformly distributed versus time. To obtain a time-uniform sequence of picture element signals the picture element signals selected by the data switch 32 are applied to a FIFO-store 40 which stores the received signals in the sequence in which they are received but which may release them at different instants. In the examples shown in FIGS. 2 and 3 the frequency of the selected picture elements is on an average four times lower than the frequency of the applied picture elements, so that the read clock of the store 40, conveyed via the line 37, amounts to one quarter of the frequency of the clock signals applied to the input 39, that is to say the read clock signal on the line 37 can be derived from the counter 38. Then the selected picture element signals occur in more uniform sequences at the output 41 of the store 40.

Figure 5:
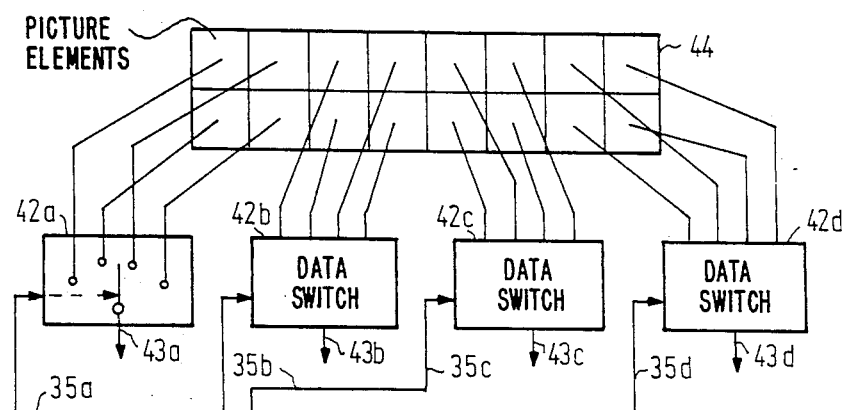
FIG. 5 is a block circuit diagram of an arrangement for the parallel processing of a number of picture element signals.

For the block circuit diagram of FIG. 5 it is assumed that the picture element signals from a total overall block 44 of picture elements, each representing a line from sub-fields within a picture field, are present in parallel. Data switches 42a, 42b, 42c and 42d, each receive all the picture element signals from a respective sub-field and select therefrom a picture element signal to be supplied to respective outputs 43a, 43b, 43c and 43d provided for each sub-field. The selection is controlled via the connections 35a, 35b, 35c and 35d respectively, which are incoming from the control arrangement 34. Since the data switches 42a etc. always select one picture element signal out of four applied signals, they may be in the form of electronic multiplexers which can be controlled by means of two bits so that each connection 35a etc. is formed by two lines. When it is assumed that the picture element signals of the picture elements are always applied to identical subfields of adjacent picture fields, the signals on the connections 35a etc. remain constant, until two complete picture lines have been processed. The store 36 contained within the control arrangement 34 and supplying the control signals via the connections 35a etc. is consequently not readdressed until after two complete picture lines have been processed. To that end, the counter 38 which controls the store 36 needs only to receive a clock signal at its input 39' after always two complete picture lines. Instead thereof it is alternatively possible to apply the clock signal to the counter 38 at each new picture field or each new group 44 of sub-fields, the store 36 then only being addressed by the stages of a higher value of the counter 38. The selected picture element signals occur at the outputs 43a etc. in a temporally regular sequence when the application of the picture signals from the groups 44 of sub-fields is effected uniformly distributed versus time.

Figure 6:
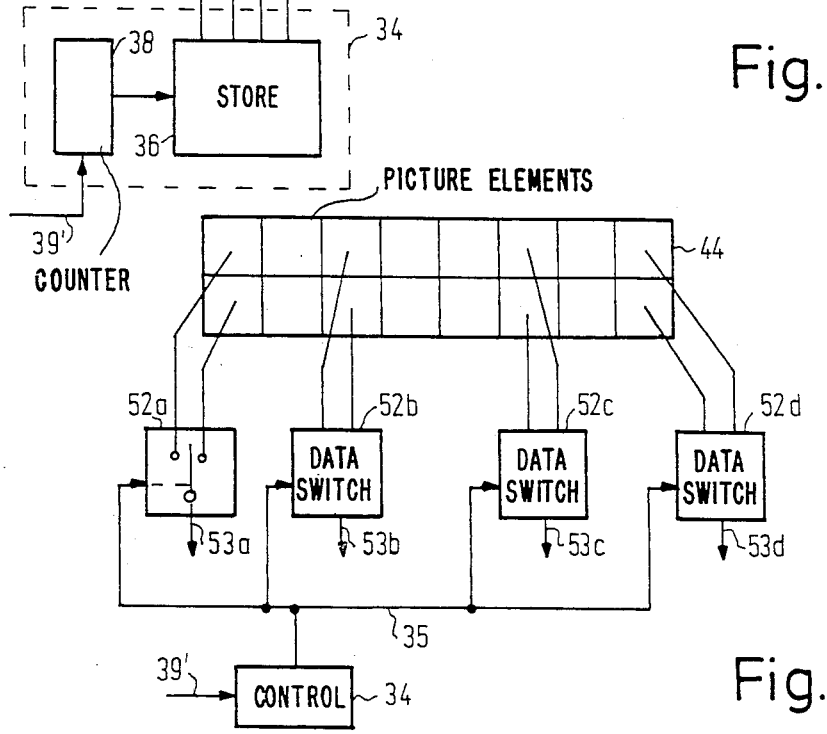
FIG. 6 is the block circuit diagram of a simplified arrangement for a predetermined selection sequence.

It will be obvious that in the selection method as shown in FIG. 2 the selected picture elements are only located at given lines and columns of the picture field 24, that is to say that given lines and columns of the overall first pseudo-halftone picture are absolutely not used. it is then absolutely not necessary for the corresponding picture element signals to be applied to the data switches. FIG. 6 shows by means of a block circuit diagram a particularly simple arrangement for this case.

Four data switches 52a, 52b, 52c and 52d are now also available, which each have, however, only two inputs. For the common switching of the data switches 52a etc. only one single control line is required whose signal must be changed-over after always four complete picture lines, that is to say after two lines from sub-field groups 44. Consequently the control arrangement does not require a store, but the control signal for the data switches 52a etc. can be directly obtained from counter 38, more specifically in dependence on the clock signal on the line 39' or its frequency from a specific stage of this counter. This results in a particularly simple structure.

Performing the foregoing method for changing the resolution of pseudo-halftone pictures may alternatively be effected with the aid of a microprocessor, for example because the addresses for a store to which the picture element values of the first pseudo-halftone picture are applied are calculated for the picture elements to be selected.

Basically, the described method can also be used for selecting predetermined picture elements when the resolution of the second pseudo-halftone picture must be higher, because the selected picture elements must be doubled or alternatively be multiplied to a greater extent than the non-selected elements. The second pseudo halftone pictures thus obtained, having in this case a higher resolution, are then also quite similar to the first pseudo-halftone picture as regards its overall optical impression.

What is claimed is:

1. A method of converting a first pseudo-halftone picture into a second pseudo-halftone picture of reduced resolution such that $n^2$ picture elements of the first picture correspond to $m^2$ picture elements of the second picture where $m<n$, said first pseudo-halftone picture being formed by a first matrix of binary picture elements whose values are determined in accordance with an ordered dither method, said converting method comprising the steps of
    dividing the first pseudo-halftone picture into contiguous picture fields each having $i \cdot n$ lines and $j \cdot n$ columns of picture elements, said picture elements being arranged in contiguous square subfields, each subfield having $n^2$ picture elements,
    selecting $m^2$ picture elements from each subfield in accordance with a selection sequence which depends on the position of the subfield in the corresponding picture field, said picture elements being selected from all $i \cdot n$ lines and all $j \cdot n$ columns of the corresponding picture field, said selection sequence being the same for each picture field, and
    generating said second pseudo-halftone picture from the picture elements selected from each picture field of the first pseudo-halftone picture.

2. A method as in claim 1 wherein said second pseudo-halftone picture is generated by arranging the selected picture elements in a second matrix, the position of each $m^2$ elements in teh second matrix basically corresponding to the position of the respective subfield in the first matrix of the first pseudo-halftone picture, whereby the optical impression of the first picture is maintained in the second picture.

* * * * *